US011861960B1

(12) United States Patent
Eid et al.

(10) Patent No.: US 11,861,960 B1
(45) Date of Patent: Jan. 2, 2024

(54) DOOR UNLOCKING SYSTEMS AND METHODS

(71) Applicant: Kindoo LLP, Kelowna (CA)

(72) Inventors: Gilbert Eid, Beit Meri (LB); Michael Chaftari, Dubai (AE)

(73) Assignee: Kindoo LLP, Kelowna (CA)

( * ) Notice: Subject to any disclaimer, the term of this patent is extended or adjusted under 35 U.S.C. 154(b) by 0 days.

(21) Appl. No.: 18/233,346

(22) Filed: Aug. 14, 2023

Related U.S. Application Data

(63) Continuation-in-part of application No. 18/142,520, filed on May 2, 2023.

(51) Int. Cl.
*G07C 9/00* (2020.01)

(52) U.S. Cl.
CPC ..... *G07C 9/00674* (2013.01); *G07C 9/00309* (2013.01); *G07C 2009/00642* (2013.01); *G07C 2009/00793* (2013.01); *G07C 2209/08* (2013.01); *G07C 2209/63* (2013.01)

(58) Field of Classification Search
None
See application file for complete search history.

(56) References Cited

U.S. PATENT DOCUMENTS

| | | | | |
|---|---|---|---|---|
| 5,606,303 A * | 2/1997 | Suski | G01B 7/16 | 338/211 |
| 5,612,520 A * | 3/1997 | Toedtman | H01H 9/226 | 200/61.78 |
| 10,122,618 B2 * | 11/2018 | Liang | H04L 45/64 | |
| 2019/0019381 A1 * | 1/2019 | Soulhiard | G07C 9/00571 | |
| 2023/0091548 A1 * | 3/2023 | Weiss | G04G 13/026 | |

* cited by examiner

*Primary Examiner* — Carlos Garcia
(74) *Attorney, Agent, or Firm* — Georgiy L. Khayet

(57) ABSTRACT

A system for unlocking a door is provided. The system includes an unlocking mechanism, an electronic board, and a mechanical switch. The unlocking mechanism is configured to unlock the door. The electronic board is configured to be activated from a sleep mode into an active mode. The sleep mode causes the electronic board to consume less than a predetermined amount of power. The mechanical switch is configured to be physically activated to close an electric circuit in the electronic board, thereby causing the electronic board to switch from the sleep mode to the active mode. Upon being activated into the active mode, the electronic board broadcasts a request to nearby computing devices to provide a verification code. Upon receiving the verification code, the electronic board activates the unlocking mechanism, thereby causing the unlocking mechanism to unlock the door, and switches back to the sleep mode.

20 Claims, 9 Drawing Sheets

DOOR UNLOCKING SYSTEMS AND METHODS

CROSS-REFERENCE TO RELATED APPLICATION

This application is a Continuation-in-part of and claims the priority benefit of U.S. patent application Ser. No. 18/142,520, entitled "DOOR LOCK OPENING DEVICE" and filed on May 2, 2023. The aforementioned application is incorporated herein by reference in its entirety for all purposes.

TECHNICAL FIELD

This disclosure relates to the field of door locks and, more particularly, to unlocking systems for door locks.

BACKGROUND

Access control systems (also known as electronic lock systems) provide a secure means for managing access to physical locations. The access control systems may include any combinations of control panels, keypads, readers, detectors, locks, and other components. The access control systems may also be called smart access control systems as they communicate with smart devices of users to verify user access rights and grant access to the users. The access control systems can be powered by an electrical grid, which requires incorporating the access control systems into an electrical system of a physical location, or by power supplies, such as batteries.

Batteries in conventional battery-operated smart access control systems typically last for a year or two, resulting in about 5,000 door openings. The main reason for the comparatively short life of the batteries is the continuous need for the access control system to be in listening mode. For example, the access control system may use infrared or other types of detectors in a constant active mode to detect the presence of an electronic device of a person and trigger opening of the doors upon detecting the electronic device. Continuous maintenance of the listening mode of some components of the access control system consumes a significant amount of power, thereby draining the energy source and leading to a shortened battery lifespan. The reduction of the battery life caused by the continuous listening mode necessitates frequent replacements or recharging of the batteries in the electronic locks, which can be inconvenient and costly.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to an example embodiment, a system for unlocking a door is provided. The system may include an unlocking mechanism, an electronic board, and a mechanical switch. The unlocking mechanism may be configured to unlock the door. The electronic board may be configured to be activated from sleep mode into an active mode. The sleep mode may cause the electronic board to consume zero or less than a predetermined amount of power. The mechanical switch may be configured to be physically activated to close an electric circuit in the electronic board, thereby causing the electronic board to switch from the sleep mode to the active mode. Upon being activated from the sleep mode into the active mode, the electronic board may broadcast a request to provide a verification code to computing devices located within a predetermined distance from the electronic board. Upon receiving the verification code from one of the computing devices, the electronic board may activate the unlocking mechanism, thereby causing the unlocking mechanism to unlock the door. The electronic board may switch to the sleep mode at the earliest occurrence of one of the following: activation of the unlocking mechanism or determination that a time elapsed since the activation of the active mode has exceeded a preset time.

According to another embodiment, a method for manufacturing a system for unlocking a door is provided. The method may include providing an unlocking mechanism configured to unlock the door. The method may further include providing an electronic board. The electronic board may be configured to be activated from sleep mode into an active mode. The sleep mode may cause the electronic board to consume zero or less than a predetermined amount of power. The method may further include providing a mechanical switch configured to be physically activated to close an electric circuit in the electronic board, thereby causing the electronic board to switch from the sleep mode to the active mode. Upon being activated from sleep mode into an active mode, the electronic board may broadcast a request to provide a verification code to computing devices located within a predetermined distance of the electronic board a request to provide a verification code. Upon receiving the verification code from one of the computing devices, the electronic board may activate the unlocking mechanism, thereby causing the unlocking mechanism to unlock the door. The electronic board may switch to the sleep mode upon the earliest occurrence of one of the following: activation of the unlocking mechanism or determination that a time elapsed since activation of the active mode has exceeded a preset time.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
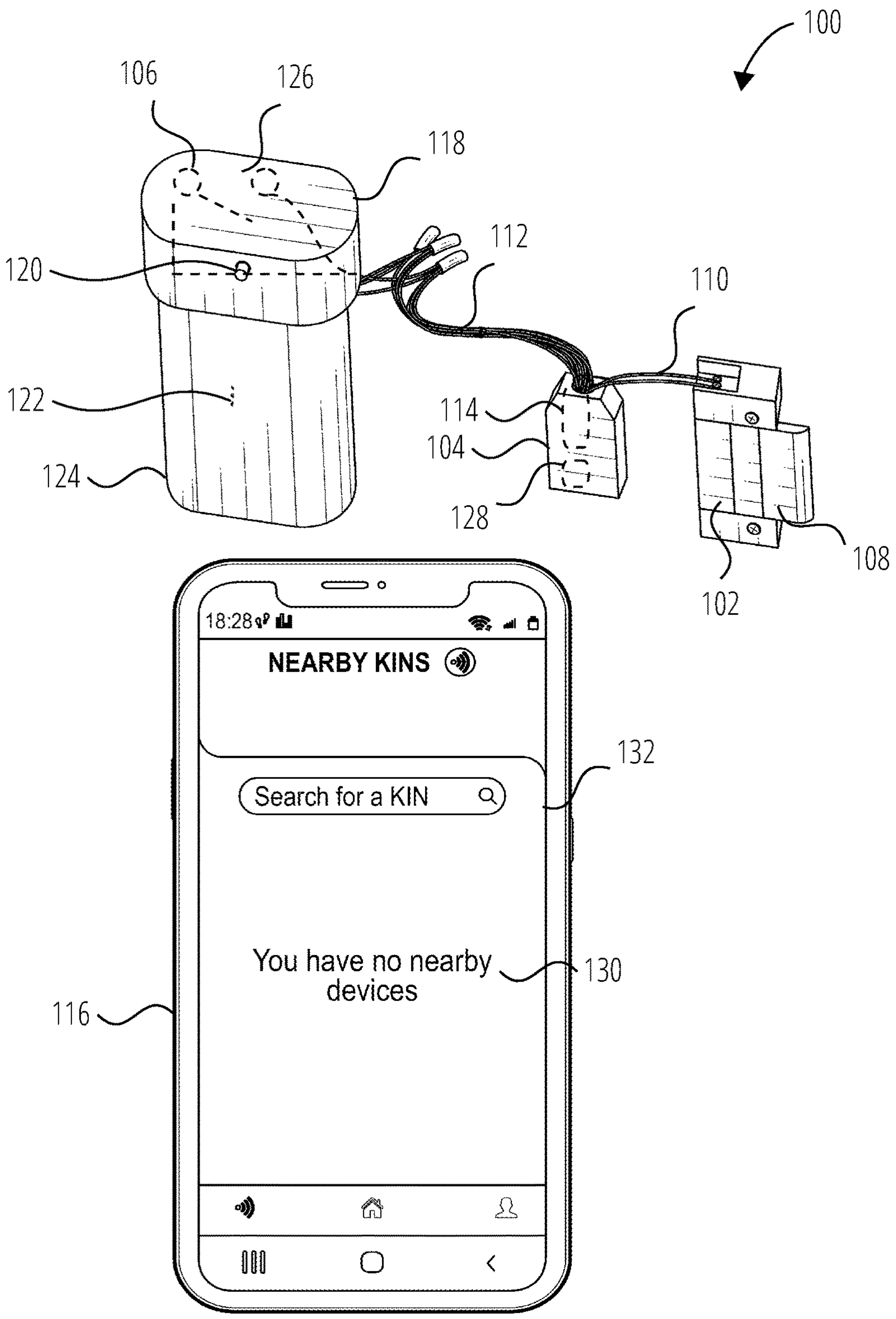
FIG. 1 shows a schematic diagram of a system for unlocking a door, according to an example embodiment.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

Generally, the embodiments of this disclosure relate to a system for unlocking a door. The system may include an unlocking mechanism configured to unlock the door. The system may further include an electronic board configured to activate the unlocking mechanism, thereby causing the unlocking mechanism to unlock the door. The electronic board may be in a sleep mode for the majority of time, which causes negligible or no consumption of electricity by the electronic board. As used herein, the term "negligible or no consumption of electricity" means consuming less than a predetermined amount of power by the electronic board. The system may further include a mechanical switch configured to be physically activated to close an electric circuit in the electronic board. Closing the electric circuit in the electronic board may cause the electronic board to switch from sleep mode to an active mode. Upon being activated from the sleep mode into the active mode, the electronic board may broadcast a request to a computing device of a person in proximity to the door to provide a verification code. Upon receiving the verification code from the computing device, the electronic board may send an activation signal to the unlocking mechanism to unlock the door. The electronic board may switch again to sleep mode immediately after sending the activation signal to the unlocking mechanism. If no verification code is received by the electronic board, the electronic board switches back to the sleep mode after a preset time.

In some example embodiments, the time period of the electronic board being activated by the mechanical switch, requesting the verification code, and sending an activation signal to the unlocking mechanism may last for less than 2 seconds. After that, the electronic board switches to sleep mode, which requires negligible or no consumption of electricity by the electronic board. Therefore, the electronic board remains in sleep mode for the most amount of time except for the time period when the electronic board is activated and sends the request for the verification code and the activation signal to the unlocking mechanism. The electronic board may be powered by a battery. Being in sleep mode for the majority of the operation time lessens the power consumption by the electronic board, thereby increasing the battery life. Due to low energy consumption, the system for unlocking a door of the present disclosure may provide at least 50,000 door openings and can last up to 10 years without changing the batteries and using small off-the-shelf batteries.

Therefore, the system for unlocking a door of the present disclosure does not need any electronic component continuously operating in an active mode to detect a person and wake up the electric circuit in the electronic board. Instead, the system of the present disclosure uses a mechanical component in the form of the mechanical switch that does not consume the electricity and can be physically activated to awaken the electric circuit in the electronic board. Therefore, the energy of the battery is consumed by the electronic board only during a period between the activation of the electronic board by the mechanical switch, communication of the electronic board with the computing device, and sending the activation signal by the electronic board to the unlocking mechanism.

Referring now to the drawings, various embodiments are described in which like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

FIG. 1 shows a schematic diagram of a system 100 for unlocking a door, according to an example embodiment. The system 100 for unlocking a door is also referred to herein as a system 100. The system 100 may include an unlocking mechanism 102, an electronic board 104, and a mechanical switch 106.

The unlocking mechanism 102 may be configured to unlock the door. The unlocking mechanism 102 may be configured to be connected to the door. In an example embodiment, the unlocking mechanism 102 may be connected to a door frame and configured to engage with a door latch (not shown) to keep the door locked. Specifically, when the unlocking mechanism 102 is in a non-activated state, the unlocking mechanism 102 may keep the door in a locked state. When the unlocking mechanism 102 is activated, the unlocking mechanism 102 may disengage the door latch to unlock the door. In FIG. 1, the unlocking mechanism 102 is shown in the non-activated state and keeps the door in the locked state.

In an example embodiment shown in FIGS. 1 and 4-6, the unlocking mechanism 102 may include an electric strike electrically coupled with the electronic board 104. The electric strike may have a keeper 108 to engage with the door latch of the door. Upon receiving an activation signal from the electronic board 104, the electric strike may move the keeper 108 to disengage the keeper 108 from the door latch, thereby unlocking the door. In an example embodiment, the electric strike may be installed on a frame of the door, for example, on the side opposite to door hinges.

The electronic board 104 is a printed circuit board that may include several components that work together to control the unlocking mechanism 102, i.e., to trigger the opening of the unlocking mechanism 102. The electronic board 104 is shown in detail in FIG. 2.

The electronic board 104 may be powered by a battery 128. The battery 128 may be connected to electronic board 104. The battery 128 may be located in the electronic board 104 or in a push pad 118. The electronic board 104 may be configured to operate in a sleep mode and an active mode.

The sleep mode may cause negligible or no consumption of electricity by the electronic board 104, i.e., less than a predetermined amount of power. In an example embodiment, the predetermined amount of power may include 120 microwatt (uW). The sleep mode without consumption of electricity is also referred to as the "off" mode or the "standby" mode. In this mode, the electronic board 104 may not be actively consuming power or performing its function.

In an example embodiment, the unlocking mechanism 102 may be battery-operated and use the power from the battery 128. The batteries may be located in the push pad 118 and may provide power to the electronic board 104 through wires 112. In an example embodiment, the batteries may be located in the electronic board 104.

The electronic board 104 may be connected to the unlocking mechanism 102 via first electrical wires 110. The mechanical switch 106 is a physically activated switch, also referred to as a manually operated switch, which requires direct physical interaction or manipulation by a person to change a state or position of the mechanical switch 106. The mechanical switch 106 may rely on physical pressure, movement, or rotation to initiate the switching action.

The mechanical switch 106 may include one or more of the following: a toggle switch, a push button switch, a rotary switch, a slide switch, a keyed switch, and so forth. A toggle switch is a switch that has a lever that can be manually flipped between two or more positions, maintaining the selected state until manually switched again. A push button switch, also known as a momentary switch, may have a button that needs to be physically pressed and released to activate or deactivate the switch. When the button is pressed, the contacts inside the push button switch come together, allowing the electric current to flow. When the button is released, the contacts separate, interrupting the electric current. A rotary switch may consist of a knob or dial that can be rotated to select different positions or settings. The rotary switch may be manually turned to make or break electrical connections associated with each position. A slide switch may have a lever or slider that can be moved back and forth to change the position of the slide switch. The slide switch may have two or more positions, and the electrical connections change accordingly as the slider is moved. A keyed switch requires the use of a physical key to operate. The key may be inserted into the keyed switch and turned to engage or disengage the switch. In an example embodiment, the mechanical switch 106 may be configured to provide tactile feedback, allowing users to have direct control over the switching action.

The electronic board 104 may have an electrical circuit 114. When the electrical circuit 114 is temporarily closed even for a very short time (in milliseconds), the electrical circuit 114 makes the electronic board 104 to wake up from the sleep mode, in which the electronic board 104 consumes negligible or no electricity from the battery 128. The electronic board 104 may not go back to the sleep mode until the electronic board 104 sends an activation signal to the unlocking mechanism (after receiving a valid verification code) or until a preset time has elapsed (for example 30 seconds), whichever occurs first. In an example embodiment, the preset time may include 30 seconds.

In an example embodiment, the mechanical switch 106 may be connected to the electrical circuit 114 of the electronic board 104 via second electrical wires 112. The second electrical wires 112 may be a part of the electrical circuit 114 of the electronic board 104. The mechanical switch 106 may be used to open or close the electrical circuit 114 of the electronic board 104 to control the flow of the electric current through the electrical circuit 114. Specifically, the mechanical switch 106 may be configured to be physically activated to close the electric electrical circuit 114 in the electronic board 104. When the mechanical switch 106 is pressed (i.e., physically activated), the contacts inside the mechanical switch 106 come together, thereby closing the electrical circuit 114 and allowing the electric current to flow through the electrical circuit 114. When the mechanical switch 106 is released, the contacts separate, interrupting the electric current. Therefore, the mechanical switch 106 may operate as an interrupter in electrical circuit 114.

FIG. 1 shows mechanical switch 106 in a non-activated state. Specifically, in FIG. 1, the mechanical switch 106 is shown open and keeps the electrical circuit 114 of the electronic board 104 open, thereby preventing the flow of the electric current through the electrical circuit 114.

The electronic board 104 may communicate with a computing device 116 of a user via an application running on the computing device 116. When the electronic board 104 is in the sleep mode as shown in FIG. 1, the electronic board 104 does not communicate with the computing device 116 of the user located in proximity to the door. Before the electronic board 104 is activated, the computing device 116 may not display an indication of a presence of the electronic board 104. Instead, the computing device 116 may display an indication 130 on a user interface 132 of the computing device 116 notifying the user that no nearby devices are present in proximity to the computing device 116.

In an example embodiment, the system 100 may further include a push pad 118. In some example embodiments, the shape of the push pad 118 may be oval (as shown in FIG. 1), round, elliptic, rectangular, and any other applicable shape. The push pad 118 may be configured to accommodate the mechanical switch 106 inside the push pad 118. In an example embodiment, the push pad 118 may have a bottom portion 124 and a top portion 126. The top portion 126 may be movable with respect to the bottom portion 124.

In an example embodiment, the push pad 118 may include at least one of a light indicator 120 and a sound indicator 122. The light indicator 120 may be configured to emit light when the door is unlocked. The sound indicator 122 may be configured to provide an alert sound when the door is unlocked. In an example embodiment, the push pad 118 may further host the batteries 128 which power the whole system 100, namely the light indicator 120, the sound indicator 122, the electronic board 104, the electrical circuit 114, and the unlocking mechanism 102.

The push pad 118 may be located at an unsecure side of the door. The unsecure side of the door is a side at which both authorized users having rights to open the door and unauthorized users having no rights to open the door may approach the door. Only push pad 118 with the mechanical switch 106 are located on the unsecure side of the door. The rest of the components of the system 100, i.e., the unlocking mechanism 102 and the electronic board 104, may be located at a secure side of the door (e.g., on a side facing the room or facility closed by the door, or inside the door frame) and may not be accessible for the unauthorized users.

Figure 2:
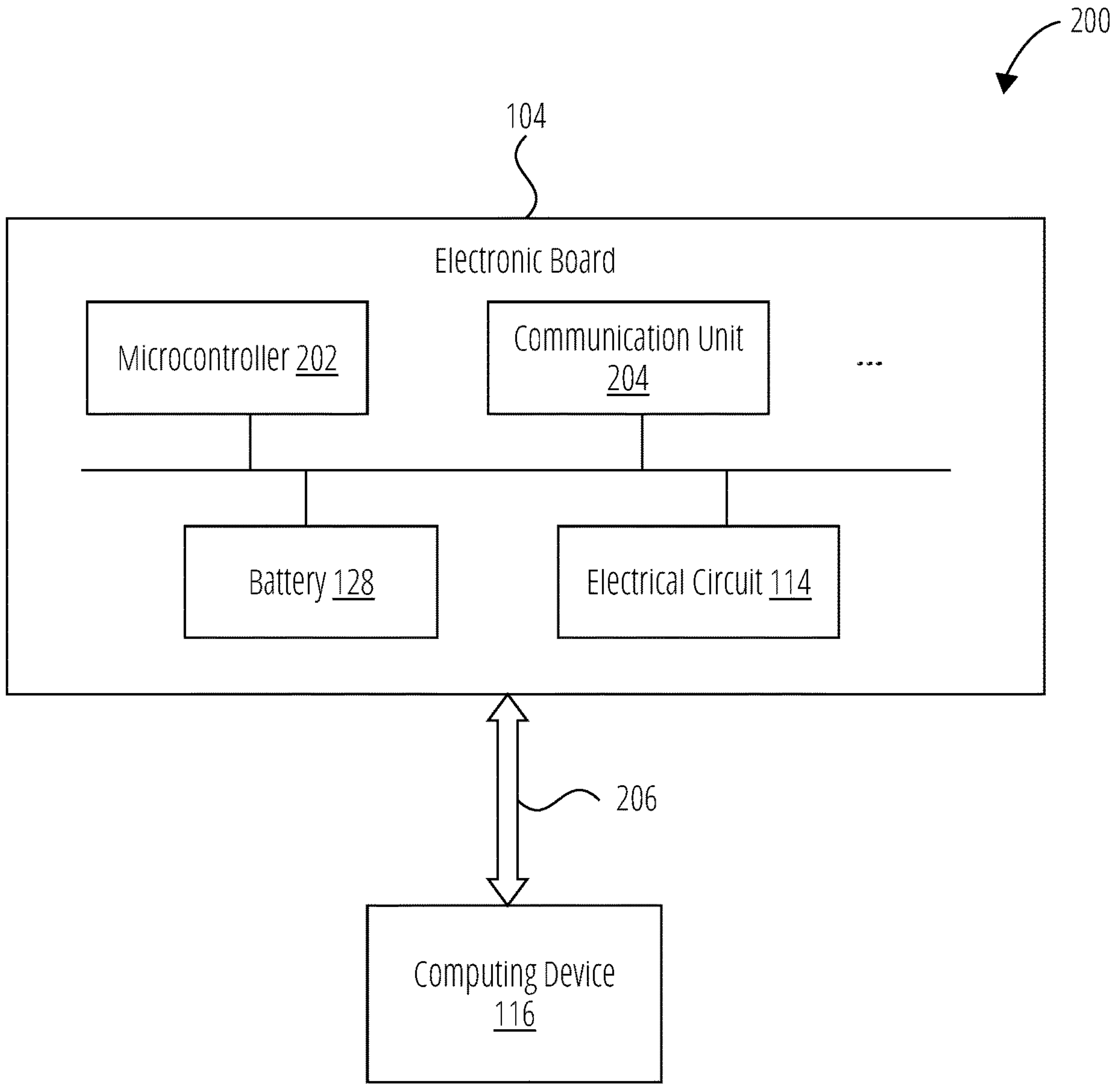
FIG. 2 is a block diagram illustrating communication between an electronic board and a computing device, according to an example embodiment.

FIG. 2 is a block diagram 200 illustrating communication between the electronic board 104 and the computing device 116, according to an example embodiment. The electronic board 104 may include a microcontroller 202, a communication unit 204, a battery 128, and an electrical circuit 114. The electronic board 104 may also include additional or other components necessary for operations of the electronic board 104 (e.g., resistors, capacitors, transistor, diodes, and so forth).

Microcontroller 202 may include an integrated circuit configured to perform predetermined operations associated with activation of the unlocking mechanism 102 shown in FIG. 1.

Communication unit 204 may be configured to communicate with the computing device 116 using a communication channel 206. In an example embodiment, communication unit 204 may include a Bluetooth™ module. In some example embodiments, the communication unit 204 may include one of a Wi-Fi™ module, a near field communication module, and the like. In an example embodiment, the communication channel 206 is a Bluetooth™ communication channel. In some example embodiments, communication channel 206 may include one of a Wi-Fi™ communication channel, a near field communication channel, and the like.

The battery 128 may include an alkaline battery, a nickel metal hydride (NiMH) battery, a lithium ion battery, and so forth. The electronic board 104 may have one or more batteries 128.

In an example embodiment, the mechanical switch 106 shown in FIG. 1 may be connected to the electrical circuit 114 of the electronic board 104. The mechanical switch 106 may be physically activated to close the electrical circuit 114 of the electronic board 104 to control the flow of the electric current through the electrical circuit 114. When the mechanical switch 106 is closed even for a very short period of time, it is sufficient for the electronic board 104 to wake up from the sleep mode.

Figure 3:
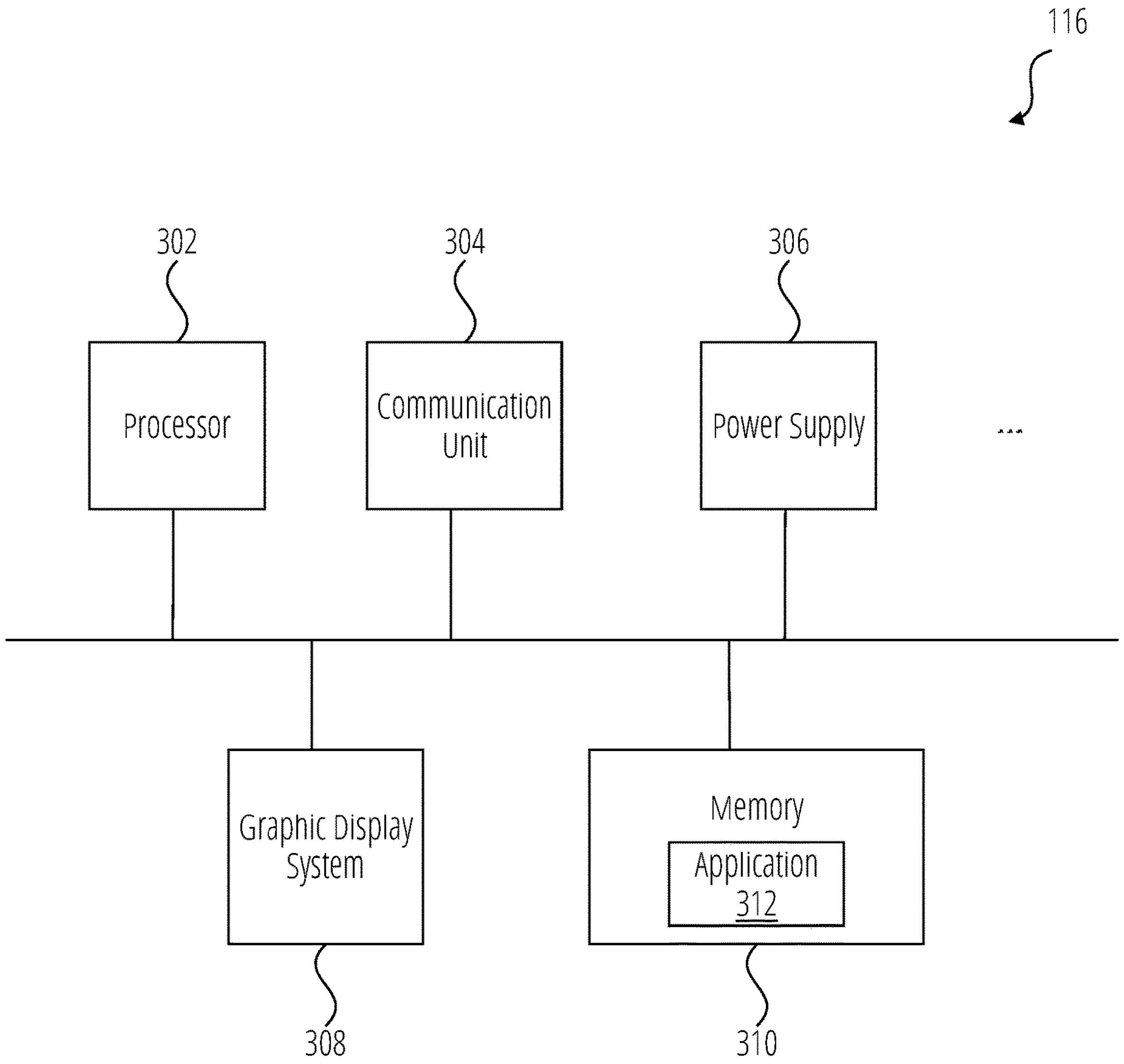
FIG. 3 is a block diagram illustrating a structure of a computing device, according to an example embodiment.

FIG. 3 is a block diagram illustrating a structure of computing device 116, according to an example embodiment. The computing device 116 may include a processor 302, a communication unit 304, a power supply 306, a graphic display system 308, and a memory 310. The computing device 116 may also include additional or other components necessary for operations of the computing device 116. In other embodiments, computing device 116 may include fewer components that perform similar or equivalent functions to those depicted in FIG. 3.

The processor 302 may include an electronic circuitry that executes instructions and performs calculations, enabling the computing device 116 to perform various functions.

The communication unit 304 may include a wireless radio module configured to receive data using one or more wireless technology standards, including but not limited to Global System for Mobile Communications (GSM), 3G, 4G, 5G, Wi-Fi™, Bluetooth™, and near field communication standard. The communication unit 304 may communicate with an electronic board of the system 100 via a communication channel 206 shown in FIG. 2.

The power supply 306 may be responsible for converting and supplying electrical power to the computing device 116, allowing the computing device 116 to operate.

The graphic display system 308 may include a combination of hardware and software components responsible for rendering and displaying visual content on a screen of the computing device 116. The graphic display system 308 may include the screen, a display controller, a graphics processing unit, and other components enabling the computing device 116 to generate and present graphical information to a user.

Memory 310 is an electronic storage component that stores data and instructions required for the operation of the computing device 116. The memory 310 may store an application 312. The application 312 may be associated with the system 100 shown in FIG. 1. The application 312 may include processor-executable codes. Upon executing the application 312, the processor 302 can be configured at least to detect the present of nearby devices in proximity to the computing device 116, analyze the signal received by the communication unit 304 from the electronic board 104, and send data to the electronic board 104.

Figure 4:
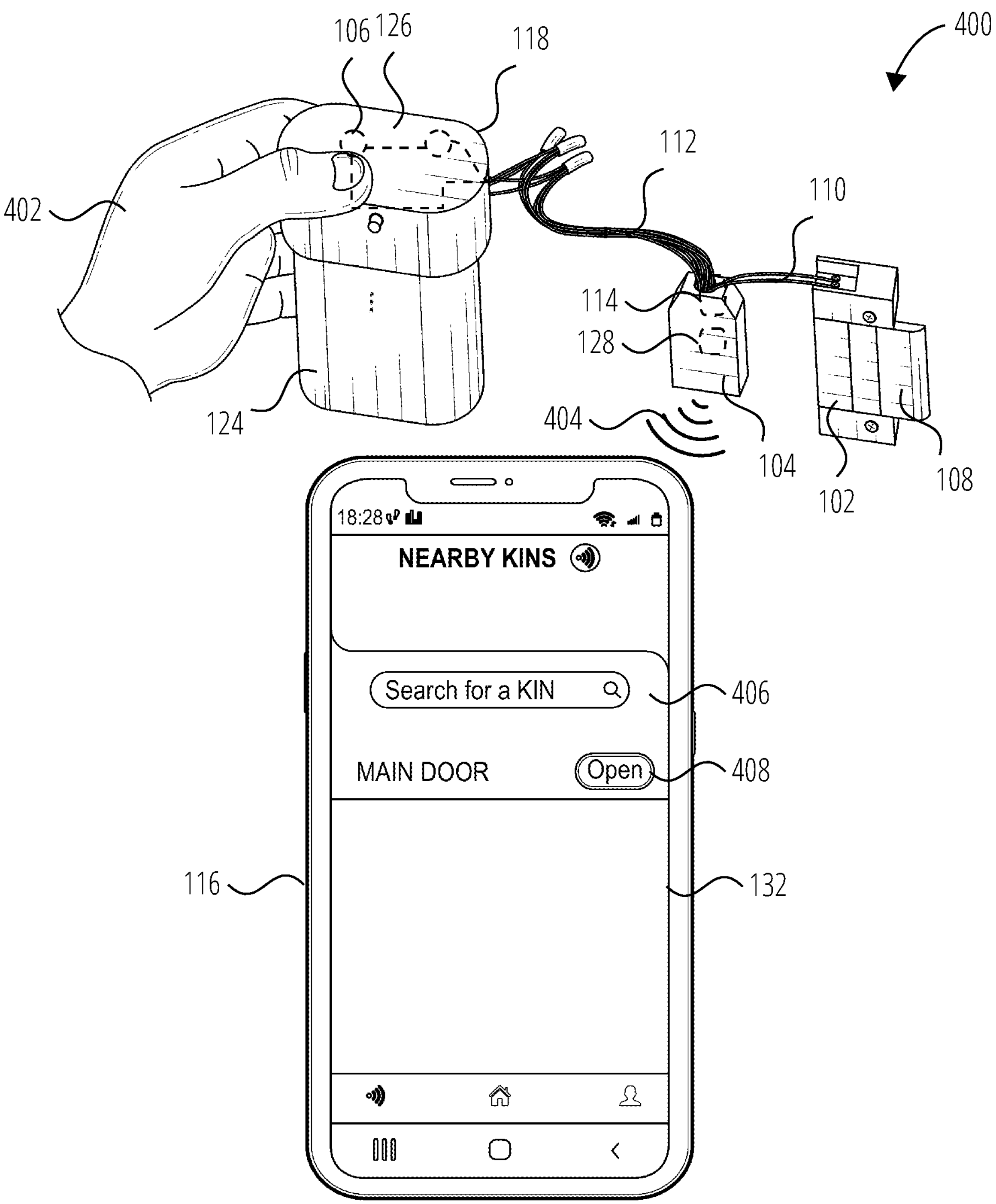
FIG. 4 is a schematic diagram showing physical activation of a mechanical switch of a system for unlocking a door, according to an example embodiment.

FIG. 4 is a schematic diagram 400 showing physical activation of the mechanical switch 106 of the system 100, according to an example embodiment. The mechanical switch 106 may be configured to be physically activated. In an example embodiment, a user 402 may push, press, or turn the mechanical switch 106 to activate the mechanical switch 106.

In an example embodiment in which the mechanical switch 106 is located in the push pad 118, the mechanical switch 106 may be configured to be activated by pressing the push pad 118. In an example embodiment, the mechanical switch 106 may be activated by pressing the top portion 126 of the push pad 118 to move the top portion 126 towards the bottom portion 124 of the push pad 118. Moving the top portion 126 towards the bottom portion 124 may cause contacting of the top portion 126 with the mechanical switch 106 and pressing the mechanical switch 106 by the top portion 126. Applying the pressure on the mechanical switch 106 may connect the contacts of the mechanical switch 106 together, thereby activating the mechanical switch 106. In FIG. 4, the mechanical switch 106 is shown closed, i.e., activated.

As the mechanical switch 106 is connected to the electrical circuit 114 of the electronic board 104, the activation of the mechanical switch 106 closes the electrical circuit 114 in the electronic board 104. Closing of the electric electrical circuit 114 in the electronic board 104 by the mechanical switch 106 even for a very short period of time (for example, 1-2 milliseconds) causes the electronic board 104 to switch from the sleep mode to the active mode. Switching from the sleep mode to the active mode initiates power consumption by the electronic board 104. After the user stops applying the pressure on the mechanical switch 106, the mechanical switch 106 may be deactivated, i.e., switched to an open state. This does not mean that the electronic board 104 switches back to the sleep mode when the mechanical switch 106 is deactivated. The electronic board 104 may only switch to the sleep mode after sending an activation signal to the mechanical switch 106 or after a preset period of time (for example, 30 seconds), whichever occurs first.

Upon being activated from the sleep mode into the active mode, the electronic board 104 may broadcast a request 404 to one or more nearby computing devices 116 to provide a verification code. The one or more nearby computing devices 116 may include computing devices 116 located in proximity of the electronic board 104, for example, computing devices 116 located within a predetermined distance from the electronic board 104. In an example embodiment, the predetermined distance may include 10 meters. The request 404 may be sent via a communication channel 206 between the electronic board 104 and computing device 116 shown in FIG. 2.

Upon detecting the broadcast of the request 404 by the electronic board 104, the computing device 116, which may be one of the computing devices 116 located within the predetermined distance from the electronic board 104, may display on the user interface 132 an indication 406 of the presence of the electronic board 104 associated with the door and located in proximity to the computing device 116.

The verification code may be generated by or stored in the application associated with the system 100 and running on the computing device 116. The application may generate or store the verification code only if the user of the computing device 116 is preliminarily authorized to open the door. The verification code may include a code granting opening of the door.

As shown in FIG. 4, when electronic board 104 sends the request 404 to the computing device 116, the unlocking mechanism 102 is in the non-activated state and keeps the door in the locked state.

Figure 5:
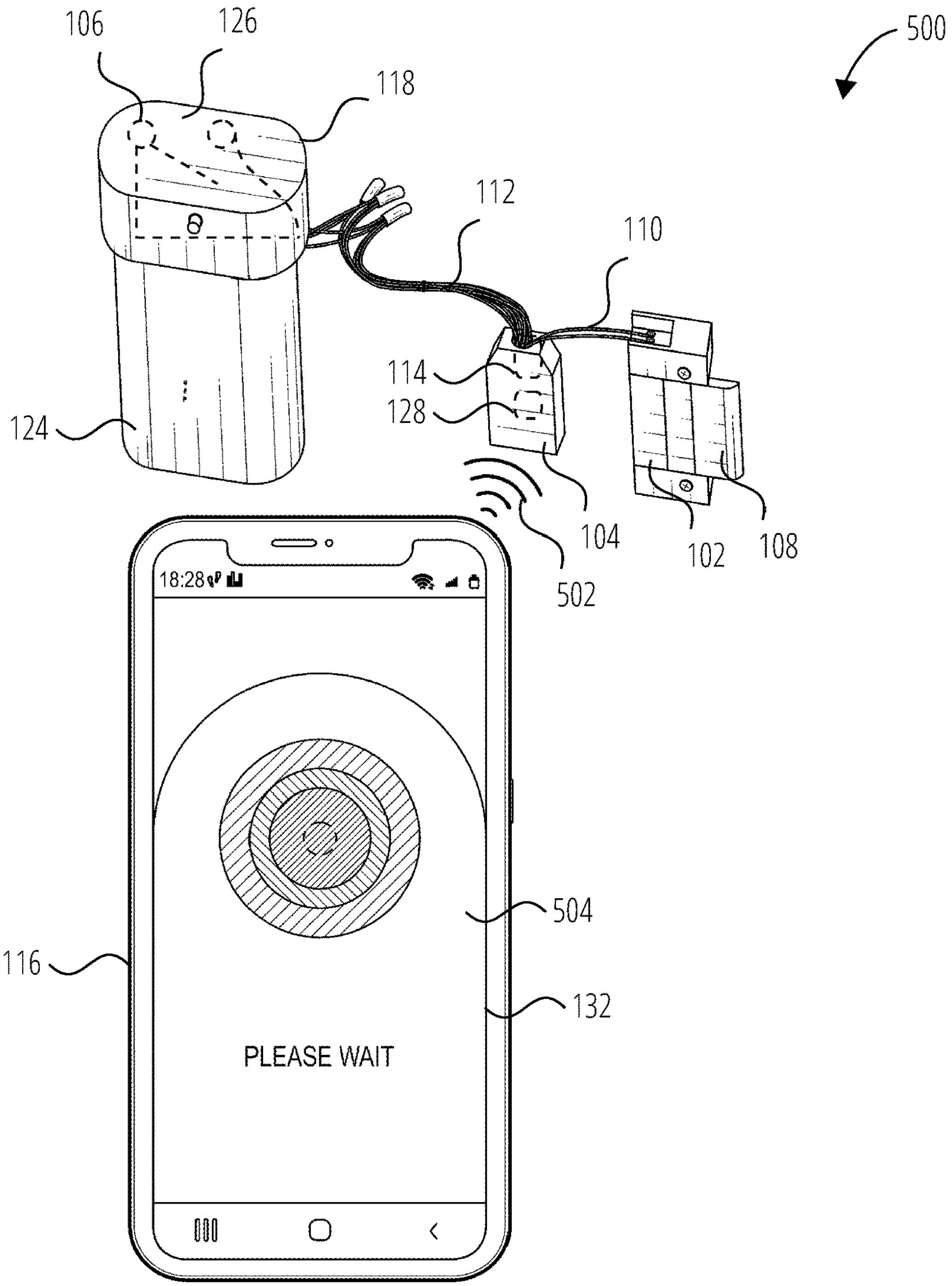
FIG. 5 is a schematic diagram showing sending a verification code by a computing device to an electronic board, according to an example embodiment.

FIG. 5 is a schematic diagram 500 showing sending a verification code by the computing device 116 to the electronic board 104, according to an example embodiment. In some example embodiments, upon detecting the broadcast and receiving the request 404 from the electronic board 104, the computing device 116 may automatically send a verification code 502 to the electronic board 104. The verification code 502 may be sent via a communication channel 206 between the electronic board 104 and computing device 116 shown in FIG. 2.

In an example embodiment, in response to the request 404 from the electronic board 104, the computing device 116 may provide a user interface enabling the user to authorize sending the verification code 502 to the electronic board 104. The user interface may include an open icon 408 shown in FIG. 4. The user may select the open icon 408 to initiate sending the verification code 502 to the electronic board 104 and opening of the door. After the user authorizes sending of the verification code 502, the computing device 116 may send the verification code 502 to the electronic board 104. When sending the verification code 502, computing device 116 may display an indication 504 notifying the user to wait for opening of the door.

As shown in FIG. 5, when computing device 116 sends the verification code 502, the unlocking mechanism 102 is still in the non-activated state and keeps the door in the locked state.

Figure 6:
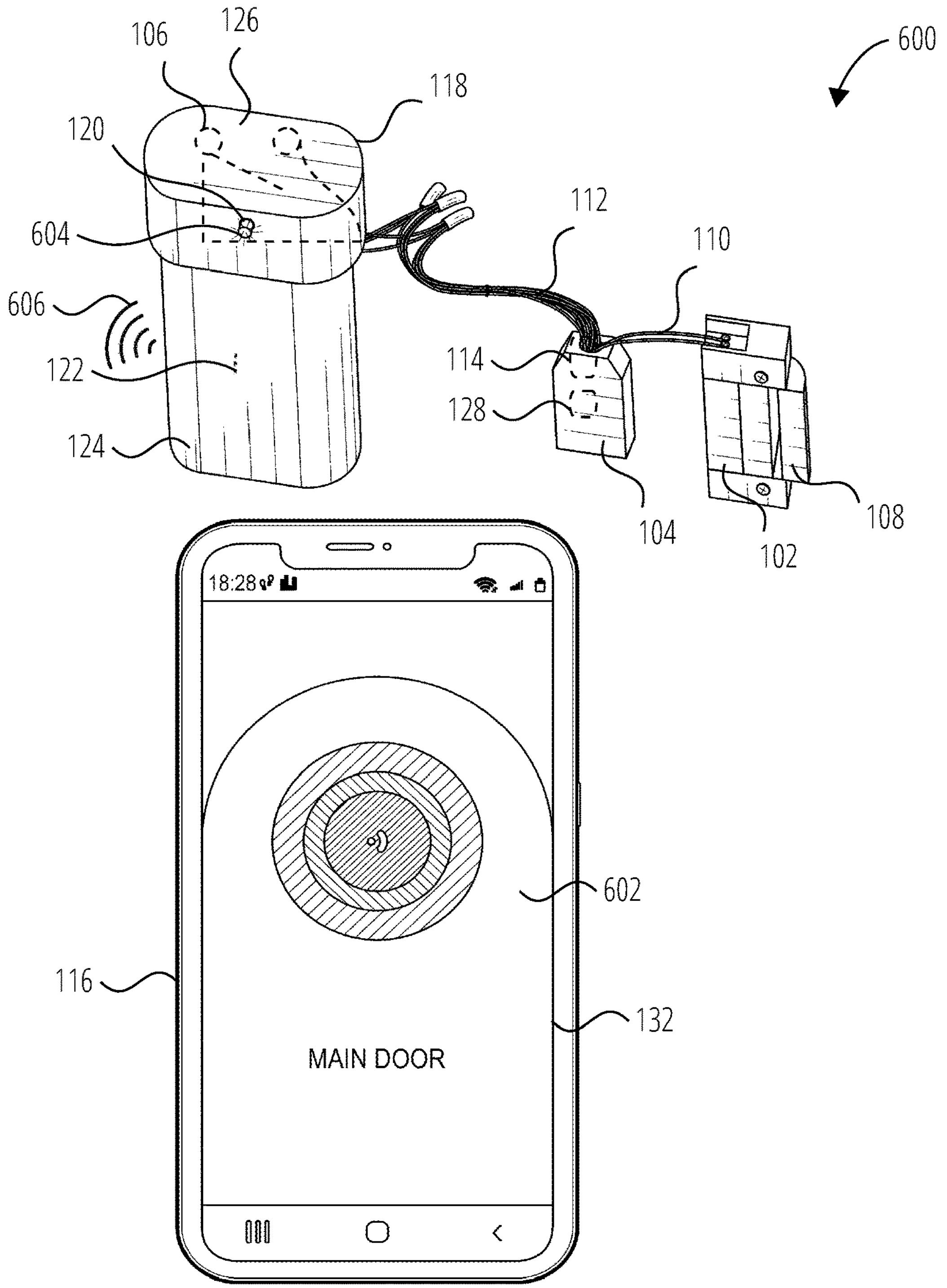
FIG. 6 is a schematic diagram showing opening of an unlocking mechanism by an electronic board, according to an example embodiment.

FIG. 6 is a schematic diagram 600 showing triggering the unlocking mechanism 102 by the electronic board 104 to open the door, according to an example embodiment. Upon receiving the verification code from the computing device 116, the electronic board 104 may send an activation signal to the unlocking mechanism 102 to activate the unlocking mechanism 102, thereby causing the unlocking mechanism 102 to unlock the door. As shown FIG. 6, the unlocking mechanism 102 is switched to an activated state and unlocks the door. Specifically, the unlocking mechanism 102 may move the keeper 108 to disengage the keeper 108 from the door latch, thereby unlocking the door. In FIG. 6, keeper 108 is shown in a disengaged state with the door.

The computing device 116 may display an indication 602 on the user interface 132 notifying the user that the door is open.

Upon sending the activation signal to the unlocking mechanism 102, the electronic board 104 may immediately switch from the active mode to the sleep mode, thereby causing no further power consumption by the electronic board 104. Therefore, the electronic board 104 may consume the power from the battery 128 only during a period between the activation of the electronic board 104 by closing the electrical circuit 114 by the mechanical switch 106, communication of the electronic board 104 with the computing device 116, and sending the activation signal by the electronic board 104 to the unlocking mechanism 102.

After being activated by the electronic board 104, the unlocking mechanism 102 may stay open for a predetermined period of time (e.g., several seconds) needed for the user to open the door. After the predetermined period of time, the unlocking mechanism 102 may switch to the non-activated state and keep the door closed.

In an example embodiment, upon sending the activation signal to the unlocking mechanism 102 and prior to switching from the active mode to the sleep mode, the electronic board 104 may send a signal to the light indicator 120 to instruct the light indicator to emit light 604. In some example embodiments, upon sending the activation signal to the unlocking mechanism 102 and prior to switching from the active mode to the sleep mode, the electronic board 104 may send a signal to the sound indicator 122 to instruct the sound indicator to produce alert sound 606. The light 604 and the alert sound 606 may be the indicators of the door being open.

Figure 7:
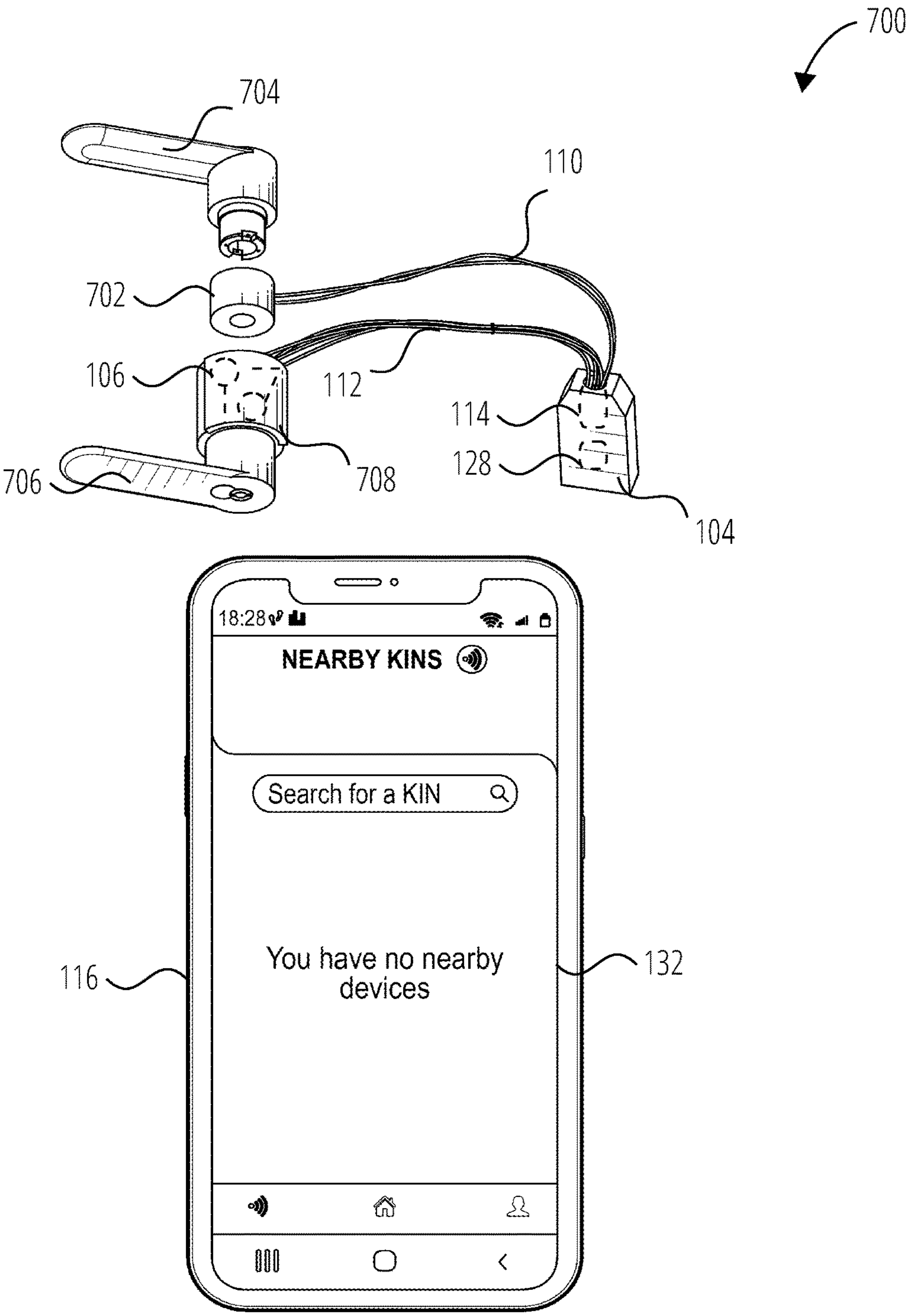
FIG. 7 is a schematic diagram showing an unlocking mechanism in the form of an engagement mechanism engaging an inside handle and an outside handle of a door, according to an example embodiment.

FIG. 7 is a schematic diagram 700 showing an unlocking mechanism of the system 100 in the form of an engagement mechanism 702 engaging an inside handle 704 and an outside handle 706 of the door, according to an example embodiment. The unlocking mechanism may include an engagement mechanism 702 configured to rotationally engage the inside handle 704 and the outside handle 706. The inside handle 704 may be located at a secure side of the door and permanently rotationally engaged with an internal latching mechanism (not shown) of a lock of the door. The secure side of the door may include a side of the door accessible only by an authorized person. The outside handle 706 may be located at an unsecure side of the door that is accessible both by an authorized person and an unauthorized person. The engagement mechanism 702 can be arranged between the inside handle 704 and the outside handle 706. The engagement mechanism 702, the inside handle 704, and the outside handle 706 may be parts of an opening device for the door. The engagement mechanism 702 may include one of an electrical magnet, an electro-mechanical motor, a solenoid, and so forth. Details of engagement mechanism 702 are described in U.S. application Ser. No. 18/142,520, which is incorporated herein as reference.

The mechanical switch 106 may be integrated into the outside handle 706. In an example embodiment, a push pad 708 accommodating the mechanical switch 106 may be integrated into the outside handle 706. In FIG. 7, the mechanical switch 106 is shown in a non-activated state. The mechanical switch 106 may be activated by pressing the push pad 708 on the outside handle 706 by the user. In an example embodiment, the rotation of the outside handle 706 may cause pushing of the push pad 708 integrated into the outside handle 706. In some example embodiments, the user may rotate the outside handle 706 along with pushing the push pad 708.

The electronic board 104 may be connected to the push pad 708 by second electrical wires 112 and connected to the engagement mechanism 702 by first electrical wires 110. In an example embodiment, the electronic board 104 may be located in the inside handle 704. The electronic board 104 may be configured to communicate with the computing device 116 as described with reference to FIG. 4 and FIG. 5.

Upon being physically activated, the mechanical switch 106 may activate the electronic board 104 by closing the electrical circuit 114 of the electronic board 104. Upon being activated, electronic board 104 may broadcast a request for the verification code to the computing device 116. Upon receiving the verification code, the electronic board 104 may send an activation signal to the engagement mechanism 702, thereby causing the engagement mechanism 702 to engage the inside handle 704 and the outside handle 706. Upon the inside handle 704 and the outside handle 706 being engaged by the engagement mechanism 702, the rotation of the outside handle 706 may cause the rotation of the inside handle 704. In turn, the rotation of the inside handle 704 may cause the rotation or movement of the internal latching mechanism engaged with the inside handle 704. The rotation or movement of the internal latching mechanism may cause unlocking of the lock of the door. Therefore, the door may be unlocked by rotating the outside handle 706 and pushing or tapping the push pad 708. Once the electronic board 104 sends the activation signal to the engagement mechanism 702, the electronic board 104 goes back to its sleep mode.

In an example embodiment, the unlocking mechanism in the form of the engagement mechanism 702 engaging the inside handle 704 and the outside handle 706 shown in FIG. 7 may be battery-operated.

In an example embodiment, the outside handle 706 may have a sound indicator (similar to a sound indicator 122 shown in FIG. 1) to produce an alert sound and a light indicator (similar to a light indicator 120 shown in FIG. 1) to produce light when access is granted to the user and the door is unlocked.

Figure 8:
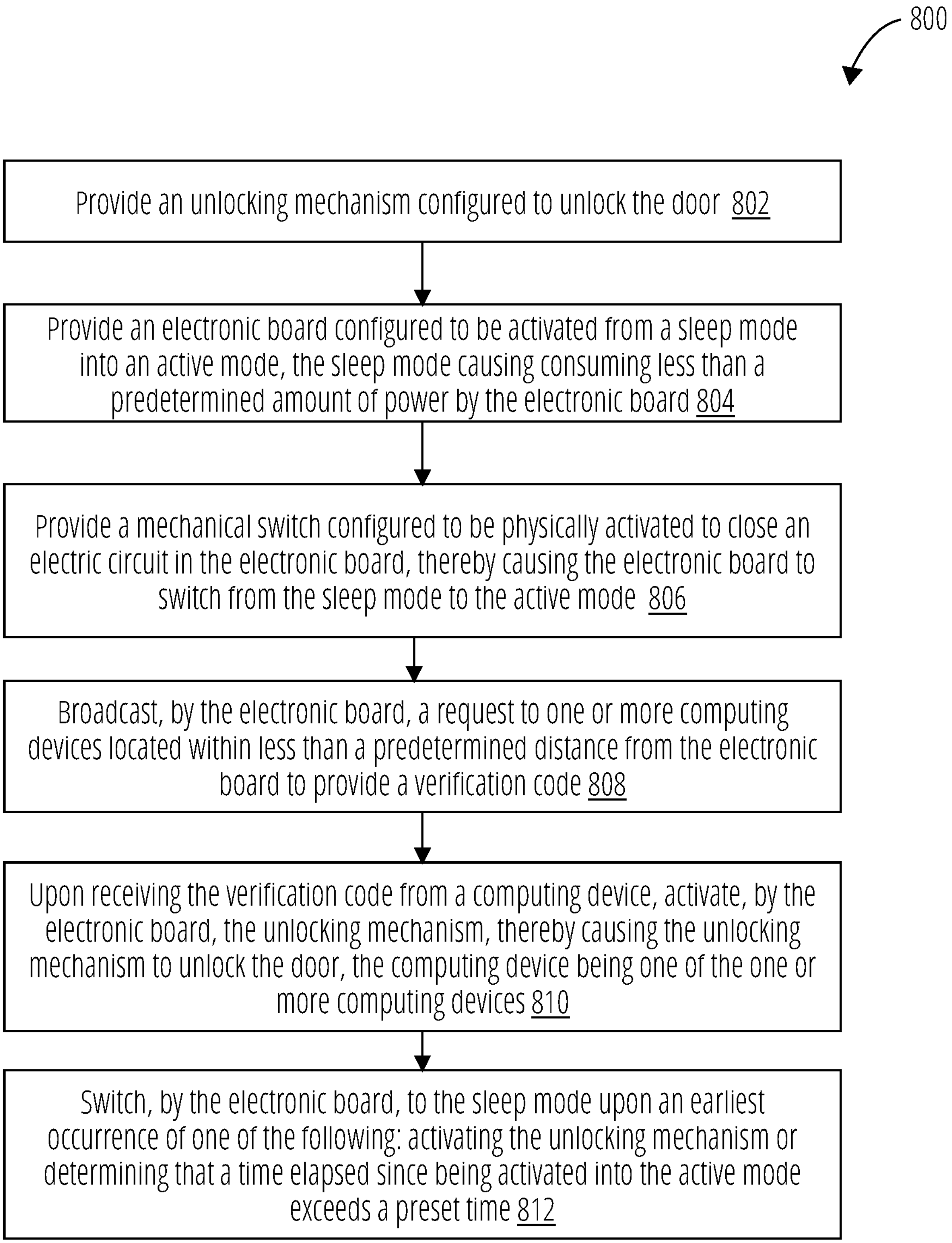
FIG. 8 illustrates a method for manufacturing a system for unlocking a door, in accordance with one embodiment.

FIG. 8 illustrates a method 800 for manufacturing a system for unlocking a door, in accordance with one embodiment. In some embodiments, the operations of the method 800 may be combined, performed in parallel, or performed in a different order. The method 800 may also include additional or fewer operations than those illustrated.

The method 800 may commence in block 802 with providing an unlocking mechanism configured to unlock the door. In block 804, method 800 may proceed with providing an electronic board. In block 806, method 800 may include providing a mechanical switch configured to be physically activated to close an electric circuit in the electronic board, thereby causing the electronic board to switch from a sleep mode to an active mode.

The electronic board may be configured to be activated from the sleep mode into the active mode. The sleep mode may cause negligible consumption or no consumption of electricity by the electronic board. In an example embodiment, the electronic board may be powered by a battery.

Upon being activated from the sleep mode into the active mode, the electronic board may broadcast a request to computing devices located within a predetermined distance from the electronic board to provide a verification code in block 808. The electronic board and the computing device may communicate via an application running on the computing device. Before the electronic board is activated, the computing device may not display an indication of the presence of the electronic board. Upon detecting the broadcast of the electronic board, the computing device may display the indication of the presence of the electronic board.

In an example embodiment, the computing device may be configured to automatically send the verification code to the electronic board in response to the request from the electronic board. In some example embodiments, in response to the request from the electronic board, the computing device may provide a user interface enabling a user to authorize sending the verification code to the electronic board. Upon authorization by the user of sending the verification code, the computing device may send the verification code to the electronic board.

In block 810, method 800 may proceed with activating the unlocking mechanism by the electronic board upon receiving the verification code from a computing device being one of the one or more computing devices located within the predetermined distance from the electronic board. The activation of the unlocking mechanism may cause the unlocking mechanism to unlock the door. In block 812, the electronic board may switch back to the sleep mode once the activation signal is sent by the electronic board to the unlocking mechanism or upon determination by the electronic board that a time elapsed since activation of the active mode exceeds a preset time (e.g., 30 seconds.), whichever occurs earlier.

In an example embodiment, the method 800 may optionally include providing a push pad. The push pad may be located on an unsecure side of the door. The unsecure side of the door may be a side of the door that can be accessed by an authorized person and an unauthorized person. The mechanical switch may be activated by pressing the push pad. The push pad may include at least one of a light indicator and a sound indicator. The light indicator may be configured to emit light when the door is unlocked. The sound indicator may be configured to provide an alert sound when the door is unlocked.

In an example embodiment, the unlocking mechanism may include an electric strike electrically coupled with the electronic board and configured to unlock the door upon receiving an activation signal from the electronic board.

In some example embodiments, the unlocking mechanism may include an engagement mechanism configured to rotationally engage an inside handle and an outside handle. The inside handle may be located at a secure side of the door and permanently rotationally engaged with an internal latching mechanism of a lock of the door. The outside handle may be located at an unsecure side of the door.

The method 800 may optionally include providing a push pad integrated into the outside handle. The mechanical switch may be connected to the push pad and may be activated by pressing the push pad. Upon being activated by the mechanical switch, the electronic board may cause the engagement mechanism to engage the inside handle and the outside handle. Therefore, rotation of the outside handle may cause rotation or movement of the inside handle and the internal latching mechanism engaged with the inside handle. The rotation or movement of the internal latching mechanism may cause unlocking of the lock of the door.

Figure 9:
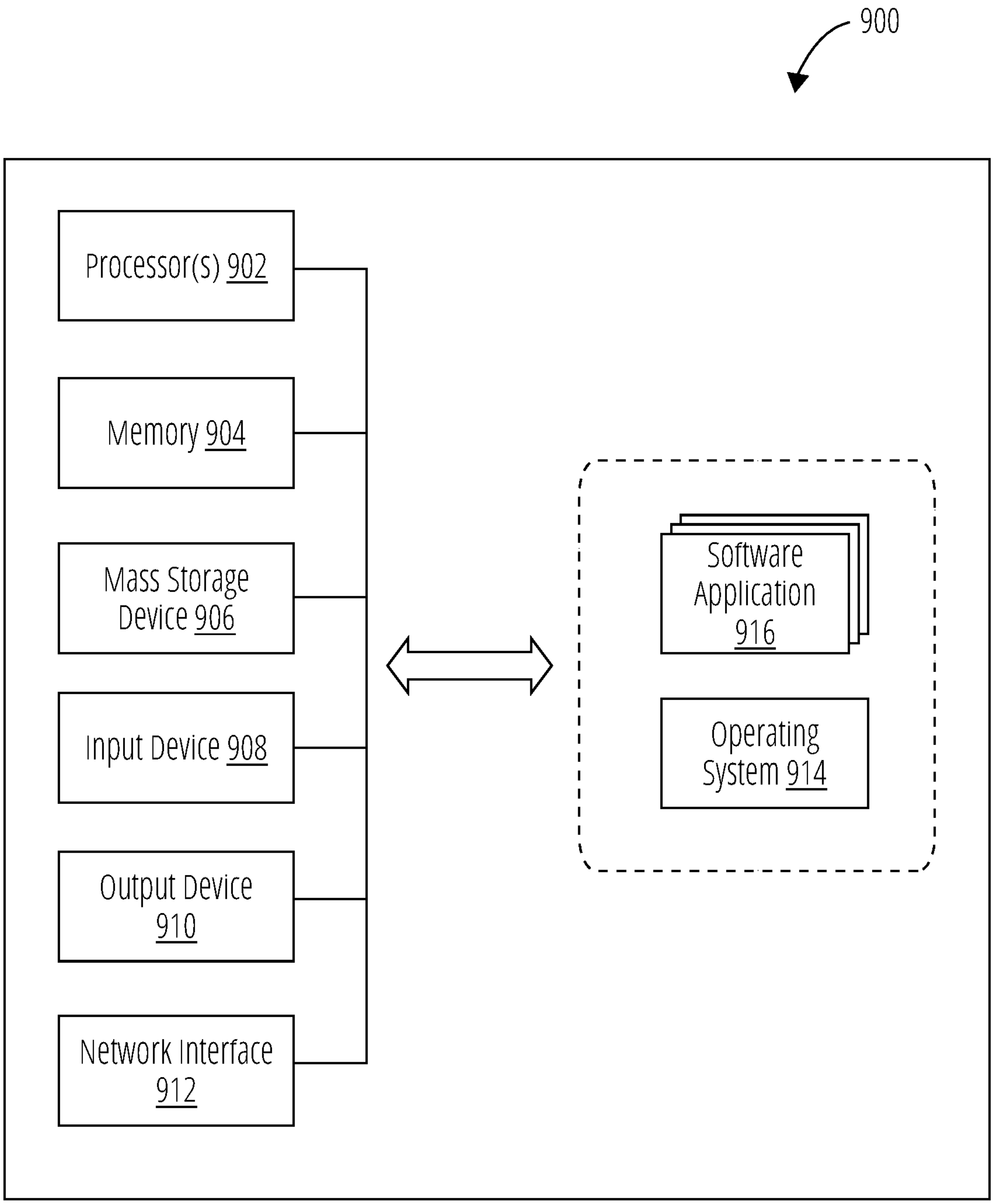
FIG. 9 is a high-level block diagram illustrating an example computer system, within which a set of instructions for causing the machine to perform any one or more of the methodologies discussed herein can be executed.

FIG. 9 is a high-level block diagram illustrating an example computer system 900, within which a set of instructions for causing the machine to perform any one or more of the methodologies discussed herein can be executed. The computer system 900 may include, refer to, or be an integral part of, one or more of a variety of types of devices, such as a general-purpose computer, a desktop computer, a laptop computer, a tablet computer, a netbook, a mobile phone, a smartphone, a personal digital computer, a smart television device, and a server, among others. In some embodiments, the computer system 900 is an example of computing device 116 shown in FIG. 1. Notably, FIG. 9 illustrates just one example of the computer system 900 and, in some embodiments, the computer system 900 may have fewer elements/modules than shown in FIG. 9 or more elements/modules than shown in FIG. 9.

The computer system 900 may include one or more processor(s) 902, a memory 904, one or more mass storage devices 906, one or more input devices 908, one or more output devices 910, and a network interface 912. The processor(s) 902 are, in some examples, configured to implement functionality and/or process instructions for execution within the computer system 900. For example, the processor(s) 902 may process instructions stored in the memory 904 and/or instructions stored on the mass storage devices 906. Such instructions may include components of an operating system 914 or software applications 916. The computer system 900 may also include one or more additional components not shown in FIG. 9.

The memory 904, according to one example, is configured to store information within the computer system 900 during operation. The memory 904, in some example embodiments, may refer to a non-transitory computer-readable storage medium or a computer-readable storage device. In some examples, the memory 904 is a temporary memory, meaning that a primary purpose of the memory 904 may not be long-term storage. The memory 904 may also refer to a volatile memory, meaning that the memory 904 does not maintain stored contents when the memory 904 is not receiving power. Examples of volatile memories include random access memories (RAM), dynamic random access memories (DRAM), static random access memories (SRAM), and other forms of volatile memories known in the art. In some examples, memory 904 is used to store program instructions for execution by the processor(s) 902. The memory 904, in one example, is used by software (e.g., the operating system 914 or the software applications 916). The software applications 916 may include application 312 shown in FIG. 3.

The mass storage devices 906 may include one or more transitory or non-transitory computer-readable storage media and/or computer-readable storage devices. In some embodiments, the mass storage devices 906 may be configured to store greater amounts of information than the memory 904. The mass storage devices 906 may further be configured for long-term storage of information. In some examples, the mass storage devices 906 include non-volatile storage elements. Examples of such non-volatile storage elements include magnetic hard discs, optical discs, solid-state discs, flash memories, forms of electrically programmable memories (EPROM) or electrically erasable and programmable memories (EEPROM), and other forms of non-volatile memories known in the art.

The input devices 908, in some examples, may be configured to receive input from a user through tactile, audio, video, or biometric channels. Examples of the input devices 908 may include a keyboard, a keypad, a mouse, a trackball, a touchscreen, a touchpad, a microphone, one or more video cameras, image sensors, fingerprint sensors, or any other device capable of detecting an input from a user or other source, and relaying the input to the computer system 900, or components thereof.

The output devices 910, in some examples, may be configured to provide output to a user through visual or auditory channels. The output devices 910 may include a video graphics adapter card, a liquid crystal display (LCD) monitor, a light emitting diode (LED) monitor, an organic LED monitor, a sound card, a speaker, a lighting device, a LED, a projector, or any other device capable of generating output that may be intelligible to a user. The output devices 910 may also include a touchscreen, a presence-sensitive display, or other input/output capable displays known in the art.

The network interface 912 of the computer system 900, in some example embodiments, can be utilized to communicate with external devices via one or more data networks such as one or more wired, wireless, or optical networks including, for example, the Internet, intranet, local area network (LAN), wide area network (WAN), cellular phone networks, Bluetooth radio, and an IEEE 902.11-based radio frequency network, Wi-Fi networks®, among others. The network interface 912 may be a network interface card, such as an Ethernet card, an optical transceiver, a radio frequency transceiver, or any other type of device that can send and receive information.

The operating system 914 may control one or more functionalities of the computer system 900 and/or components thereof. For example, the operating system 914 may interact with the software applications 916 and may facilitate one or more interactions between the software applications 916 and components of the computer system 900. As shown in FIG. 9, operating system 914 may interact with or be otherwise coupled to the software applications 916 and components thereof. In some embodiments, the software applications 916 may be included in the operating system 914. In these and other examples, virtual modules, firmware, or software may be part of the software applications 916.

Thus, systems for unlocking a door and methods for manufacturing a system for unlocking a door have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for unlocking a door, the system comprising:

an unlocking mechanism configured to unlock the door;

an electronic board configured to, upon being activated from a sleep mode into an active mode, the sleep mode causing the electronic board to consume less than a predetermined amount of power:

broadcast a request to one or more computing devices located within less than a predetermined distance from the electronic board to provide a verification code;

upon receiving the verification code from the one or more computing devices, activate the unlocking mechanism, thereby causing the unlocking mechanism to unlock the door; and switch to the sleep mode upon an earliest occurrence of one of the following:

activation of the unlocking mechanism or determining that a time elapsed since activation of the active mode has exceeded a preset time; and a mechanical switch configured to be physically activated to close an electric circuit in the electronic board, thereby causing the electronic board to switch from the sleep mode to the active mode.

2. The system of claim 1, wherein the electronic board is powered by a battery.

3. The system of claim 1, further comprising a push pad located on an unsecure side of the door, the unsecure side of the door being a side of the door accessible by an authorized person and an unauthorized person, wherein the mechanical switch is activated by pressing the push pad.

4. The system of claim 3, wherein the push pad includes at least one of the following:

a light indicator configured to emit a light when the door is unlocked; and a sound indicator configured to provide an alert sound when the door is unlocked.

5. The system of claim 1, wherein the unlocking mechanism includes an electric strike electrically coupled with the electronic board and configured to unlock the door upon receiving a signal from the electronic board.

6. The system of claim 1, wherein:

the unlocking mechanism includes an engagement mechanism configured to rotationally engage an inside handle and an outside handle, the inside handle being located at a secure side of the door and permanently rotationally engaged with an internal latching mechanism of a lock of the door and the outside handle being located at an unsecure side of the door, wherein the unsecure side of the door is a side of the door accessible by an authorized person and an unauthorized person; and upon being activated, the electronic board causes the engagement mechanism to engage the inside handle and the outside handle, thereby allowing the door to be unlocked by rotating the outside handle.

7. The system of claim 6, further comprising a push pad integrated into the outside handle and wherein the mechanical switch is activated by pressing the push pad.

8. The system of claim 1, wherein:

the electronic board and the computing device communicate via an application running on the computing device;

before the electronic board is activated, the computing device does not display an indication of a presence of the electronic board; and upon detecting the broadcast of the electronic board, the computing device displays the indication of the presence of the electronic board.

9. The system of claim 8, wherein the computing device is configured to, in response to the broadcast of the electronic board, automatically send the verification code to the electronic board.

10. The system of claim 8, wherein the computing device is configured to, in response to the broadcast from the electronic board:

provide an interface enabling a user to authorize sending the verification code to the electronic board; and upon authorization by the user of the sending the verification code, send the verification code to the electronic board.

11. A method for manufacturing a system for unlocking a door, the method comprising:

providing an unlocking mechanism configured to unlock the door;

providing an electronic board configured to, upon being activated from a sleep mode into an active mode, the sleep mode causing the electronic board to consume less than a predetermined amount of power:

broadcast a request to one or more computing devices located within less than a predetermined distance from the electronic board to provide a verification code;

upon receiving the verification code from a computing device from the one or more computing devices, activate the unlocking mechanism, thereby causing the unlocking mechanism to unlock the door; and switch to the sleep mode upon an earliest occurrence of one of the following:

activating the unlocking mechanism or determination that a time elapsed since activation of the active mode has exceeded a preset time; and providing a mechanical switch configured to be physically activated to close an electric circuit in the electronic board, thereby causing the electronic board to switch from the sleep mode to the active mode.

12. The method of claim 11, wherein the electronic board is powered by a battery.

13. The method of claim 11, further comprising providing a push pad located on an unsecure side of the door, the unsecure side of the door being a side of the door accessible by an authorized person and an unauthorized person, wherein the mechanical switch is activated by pressing the push pad.

14. The method of claim 13, wherein the push pad includes at least one of the following:

a light indicator configured to emit a light when the door is unlocked; and a sound indicator configured to provide an alert sound when the door is unlocked.

15. The method of claim 11, wherein the unlocking mechanism includes an electric strike electrically coupled with the electronic board and configured to unlock the door upon receiving a signal from the electronic board.

16. The method of claim 11, wherein:

the unlocking mechanism includes an engagement mechanism configured to rotationally engage an inside handle and an outside handle, the inside handle being located at a secure side of the door and permanently rotationally engaged with an internal latching mechanism of a lock of the door and the outside handle being located at an unsecure side of the door, the unsecure side of the door being a side of the door accessible by an authorized person and an unauthorized person; and upon being activated, the electronic board causes the engagement mechanism to engage the inside handle and the outside handle, thereby allowing the door to be unlocked by rotating the outside handle.

17. The method of claim 16, further comprising providing a push pad integrated into the outside handle and wherein the mechanical switch is activated by pressing the push pad.

18. The method of claim 11, wherein:

the electronic board and the computing device communicate via an application running on the computing device;

before the electronic board is activated, the computing device does not display an indication of a presence of the electronic board; and upon detecting the broadcast of the electronic board, the computing device displays the indication of the presence of the electronic board.

19. The method of claim 18, wherein the computing device is configured to, in response to the broadcast of the electronic board, automatically send the verification code to the electronic board.

20. The method of claim 18, wherein the computing device is configured to, in response to the broadcast of the electronic board:

provide an interface enabling a user to authorize sending the verification code to the electronic board; and upon authorization by the user of the sending the verification code, send the verification code to the electronic board.

* * * * *